United States Patent
Melman et al.

(10) Patent No.: US 11,824,799 B2
(45) Date of Patent: *Nov. 21, 2023

(54) EGRESS PACKET PROCESSING USING A MODIFIED PACKET HEADER SEPARATE FROM A STORED PAYLOAD

(71) Applicant: Marvell Israel (M.I.S.L) Ltd., Yokneam (IL)

(72) Inventors: David Melman, Tel Aviv (IL); Ilan Mayer-Wolf, Tel-Aviv (IL); Carmi Arad, Nofit (IL); Rami Zemach, Givat Shapira (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 143 days.

This patent is subject to a terminal disclaimer.

(21) Appl. No.: 17/383,601

(22) Filed: Jul. 23, 2021

(65) Prior Publication Data

US 2021/0352024 A1 Nov. 11, 2021

Related U.S. Application Data

(63) Continuation of application No. 16/746,355, filed on Jan. 17, 2020, now Pat. No. 11,075,859, which is a
(Continued)

(51) Int. Cl.
*H04J 1/16* (2006.01)
*H04L 1/00* (2006.01)
(Continued)

(52) U.S. Cl.
CPC ...... *H04L 49/9084* (2013.01); *H04L 47/2441* (2013.01); *H04L 47/32* (2013.01); *H04L 69/22* (2013.01)

(58) Field of Classification Search
CPC . H04L 49/9084; H04L 47/2441; H04L 47/32; H04L 69/22
(Continued)

(56) References Cited

U.S. PATENT DOCUMENTS 7,606,927 B2 10/2009 Tasman et al.
8,023,419 B2 9/2011 Oran
(Continued)

FOREIGN PATENT DOCUMENTS

CN 102884768 A 1/2013
CN 103004158 A 3/2013

OTHER PUBLICATIONS

International Search Report and Written Opinion for PCT/IB2017/52919 datd Aug. 29, 2017 (16 pages).
(Continued)

*Primary Examiner* — Maharishi V Khirodhar

(57) ABSTRACT

A network device includes a packet processor that: determines at least one egress port via which a received packet is to be transmitted by the network device; modifies one or more fields in a header of the packet to generate a modified header; determines, based at least in part on the modified header, whether the packet a) is to be transmitted or b) is to be discarded; and stores the modified header in a packet memory. In response to the determination that the packet is to be transmitted, a transmit processor of the network device: retrieves a payload of the packet from the packet memory; retrieves the modified header from the packet memory; generates a transmit packet at least by combining the payload of the packet with the modified header; and transmits the transmit packet via the determined at least one egress port of the network device.

20 Claims, 3 Drawing Sheets

Related U.S. Application Data continuation of application No. 15/599,199, filed on May 18, 2017, now Pat. No. 10,541,947.

(60) Provisional application No. 62/338,067, filed on May 18, 2016.

(51) Int. Cl.
  *H04L 49/90* (2022.01)
  *H04L 47/2441* (2022.01)
  *H04L 47/32* (2022.01)
  *H04L 69/22* (2022.01)

(58) Field of Classification Search
  USPC ........................................................ 370/235
  See application file for complete search history.

(56) References Cited

U.S. PATENT DOCUMENTS

| | | | |
|---|---|---|---|
| 8,054,744 | B1 | 11/2011 | Bishara et al. |
| 8,279,871 | B1 | 10/2012 | Sivan et al. |
| 8,553,582 | B1 | 10/2013 | Mizrahi et al. |
| 8,565,234 | B1 | 10/2013 | Mizrahi et al. |
| 8,611,352 | B2 | 12/2013 | Mizrahi et al. |
| 8,705,365 | B1 | 4/2014 | Martin |
| 9,112,708 | B1 | 8/2015 | Arad et al. |
| 9,118,576 | B2 | 8/2015 | Roitshtein |
| 9,191,315 | B1 | 11/2015 | Mizrahi et al. |
| 9,203,711 | B2 | 12/2015 | Agarwal et al. |
| 9,565,035 | B1 | 2/2017 | Pannell |
| 9,806,985 | B2 * | 10/2017 | Fang ...................... H04L 45/04 |
| 10,003,466 | B1 | 6/2018 | Miller |
| 10,491,718 | B2 | 11/2019 | Arad et al. |
| 10,516,626 | B1 * | 12/2019 | Kodeboyina ............ H04L 49/25 |
| 10,541,947 | B2 | 1/2020 | Melman et al. |
| 11,075,859 | B2 * | 7/2021 | Melman .................. H04L 47/32 |
| 2002/0110134 | A1 | 8/2002 | Gracon et al. |
| 2005/0259649 | A1 * | 11/2005 | Smith ..................... H04L 45/02 |
| | | | 370/389 |
| 2010/0220742 | A1 | 9/2010 | Brewer et al. |
| 2011/0064084 | A1 | 3/2011 | Tatar et al. |
| 2011/0170542 | A1 | 7/2011 | Liu et al. |
| 2011/0268119 | A1 * | 11/2011 | Pong ....................... H04L 47/32 |
| | | | 370/392 |
| 2012/0140626 | A1 | 6/2012 | Anand et al. |
| 2013/0051225 | A1 | 2/2013 | Pullen |
| 2013/0088967 | A1 | 4/2013 | Kusumoto |
| 2014/0219087 | A1 | 8/2014 | Matthews et al. |
| 2014/0269378 | A1 | 9/2014 | Holbrook et al. |
| 2014/0286351 | A1 | 9/2014 | Turgeman et al. |
| 2014/0289513 | A1 * | 9/2014 | Huang .................. H04L 9/3073 |
| | | | 713/160 |
| 2014/0304802 | A1 | 10/2014 | Pope et al. |
| 2015/0381509 | A1 | 12/2015 | Sreeramoju |
| 2016/0099853 | A1 | 4/2016 | Nedeltchev et al. |
| 2016/0124772 | A1 | 5/2016 | Mirza et al. |
| 2016/0173383 | A1 | 6/2016 | Liu et al. |
| 2016/0285643 | A1 | 9/2016 | Verma |
| 2017/0250954 | A1 * | 8/2017 | Jain ...................... H04L 63/0254 |
| 2017/0339074 | A1 | 11/2017 | Melman et al. |
| 2019/0190825 | A1 | 6/2019 | Roeland |
| 2020/0153759 | A1 | 5/2020 | Melman et al. |

OTHER PUBLICATIONS

Search Report sent with Office Action in Chinese Patent Application No. 2017800444023, dated Sep. 23, 2020 (2 pages).
Office Action in Chinese Patent Application No. 201780044402.3, dated Sep. 23, 2020, with English translation (19 pages).
First Office Action for Chinese Application No. 202110825382.1, dated Dec. 20, 2022 (10 pages).
Search Report for Chinese Application No. 202110825382.1, dated Dec. 20, 2022 (2 pages).

* cited by examiner

EGRESS PACKET PROCESSING USING A MODIFIED PACKET HEADER SEPARATE FROM A STORED PAYLOAD

CROSS-REFERENCES TO RELATED APPLICATIONS

This application is a continuation of U.S. patent application Ser. No. 16/746,355, now U.S. Pat. No. 11,075,859, entitled "Egress Packet Processing Using A Modified Packet Header Separate from a Stored Payload," filed on Jan. 17, 2020, which is a continuation of U.S. patent application Ser. No. 15/599,199, now U.S. Pat. No. 10,541,947, entitled "Egress Flow Mirroring in a Network Device," filed on May 18, 2017, which claims the benefit of U.S. Provisional Patent Application No. 62/338,067, entitled "Egress Flow Mirroring to Analyzer or CPU," filed on May 18, 2016. All of the applications referenced above are incorporated herein by reference in their entireties.

FIELD OF TECHNOLOGY

The present disclosure relates generally to network devices such as network switches, bridges, routers, etc., and more particularly, to processing packets in network devices.

BACKGROUND

Network devices, such as switches, bridges and routers, forward packets through a network based on addresses in the packets. A network device typically includes a plurality of ports coupled to different network links. The network device may receive a packet via one port and process the packet at least to determine via which other port or ports the network switch should transmit the packet. The network device then forwards the packet to the determined one or more other ports. Network devices often store received packets in a packet memory, and process the packets using packet descriptors associated with the packet. After a port for transmission of a packet is determined by the network device, the network device enqueues the packet descriptor associated with the packet in an egress queue corresponding to the port for subsequent scheduling and transmission of the packet via the port. When the packet is scheduled for transmission, the network device dequeues the packet descriptor from the egress queue and retrieves the associated packet from the packet memory. In some cases, the network devices performs modification of the retrieved packet (e.g., modification of a header of the retrieved packet), and then transmits the modified packet from the port of the network device. In some cases, prior to transmission of the packet, the network device performs additional, egress, processing of the packet based on the modified packet. The additional packet processing includes, for example, egress flow classification of the packet, egress policing of the packet, egress Operations, Administration, and Maintenance (OAM) processing of the packet, etc.

Network devices sometimes perform egress packet mirroring to send copies of egressing packets to a processor or an analyzer, for example for performing network monitoring and analytics. In typical network devices, to mirror a packet, the network device generates a copy of the packet descriptor associated with the packet before the packet descriptor is enqueues in an egress queue for subsequent transmission of the packet from the network device. In some situations, however, based on the egress processing of a packet, the packet is dropped or discarded and therefore not actually transmitted from the network device. In such cases, in a typical network device, an egress packet may be mirrored even if the packet is subsequently dropped based on the egress packet processing and therefore not actually transmitted from the network device. Moreover, because egress processing of the packet in a typical network device is performed after the packet is retrieved from the packet memory, the packet cannot be readily copied after egress processing of the packet because the packet is no longer stored in the packet memory.

SUMMARY

In an embodiment, a network device for processing packets in a communication network comprises a receive processor configured to receive a packet from the communication network, and store at least a payload of the packet in a packet memory. The network device also comprises a packet processor configured to process the packet, the packet processor being configured to at least: determine at least one egress port via which the packet is to be transmitted by the network device; modify one or more fields in a header of the packet to generate a modified header; determine, based at least in part on the modified header, whether the packet a) is to be transmitted by the network device or b) is to be discarded by the network device; and store the modified header in the packet memory. The network device further comprises a transmit processor configured to, in response to the determination, made by the packet processor based at least in part on the modified header, that the packet is to be transmitted by the network device and not to be discarded by the network device: retrieve the at least the payload of the packet from the packet memory; retrieve the modified header from the packet memory; generate a transmit packet at least by combining the at least the payload of the packet with the modified header; and transmit the transmit packet via the determined at least one egress port of the network device.

In another embodiment, a method for processing packets in a communication network includes: receiving, at the network device, a packet from the communication network; storing, with the network device, at least a payload of the packet in a packet memory of the network device; and processing, with a packet processor of the network device, the packet, the processing including at least: determining at least one egress port via which the packet is to be transmitted by the network device, modifying one or more fields in a header of the packet to generate a modified header that is indicative of an access control policy applying to the packet, determining, based at least in part on the modified header, whether the packet a) is to be transmitted by the network device or b) is to be discarded by the network device, and storing the modified header in the packet memory. The method also includes: in response to determining that the packet is to be transmitted by the network device and not to be discarded by the network device: retrieving, with the network device, the at least the payload of the packet from the packet memory, retrieving, with the network device, the modified header from the packet memory, generating, with the network device, a transmit packet at least by combining the at least the payload of the packet with the modified header, and transmitting the transmit packet via the determined at least one egress port of the network device.

DETAILED DESCRIPTION

Figure 1:
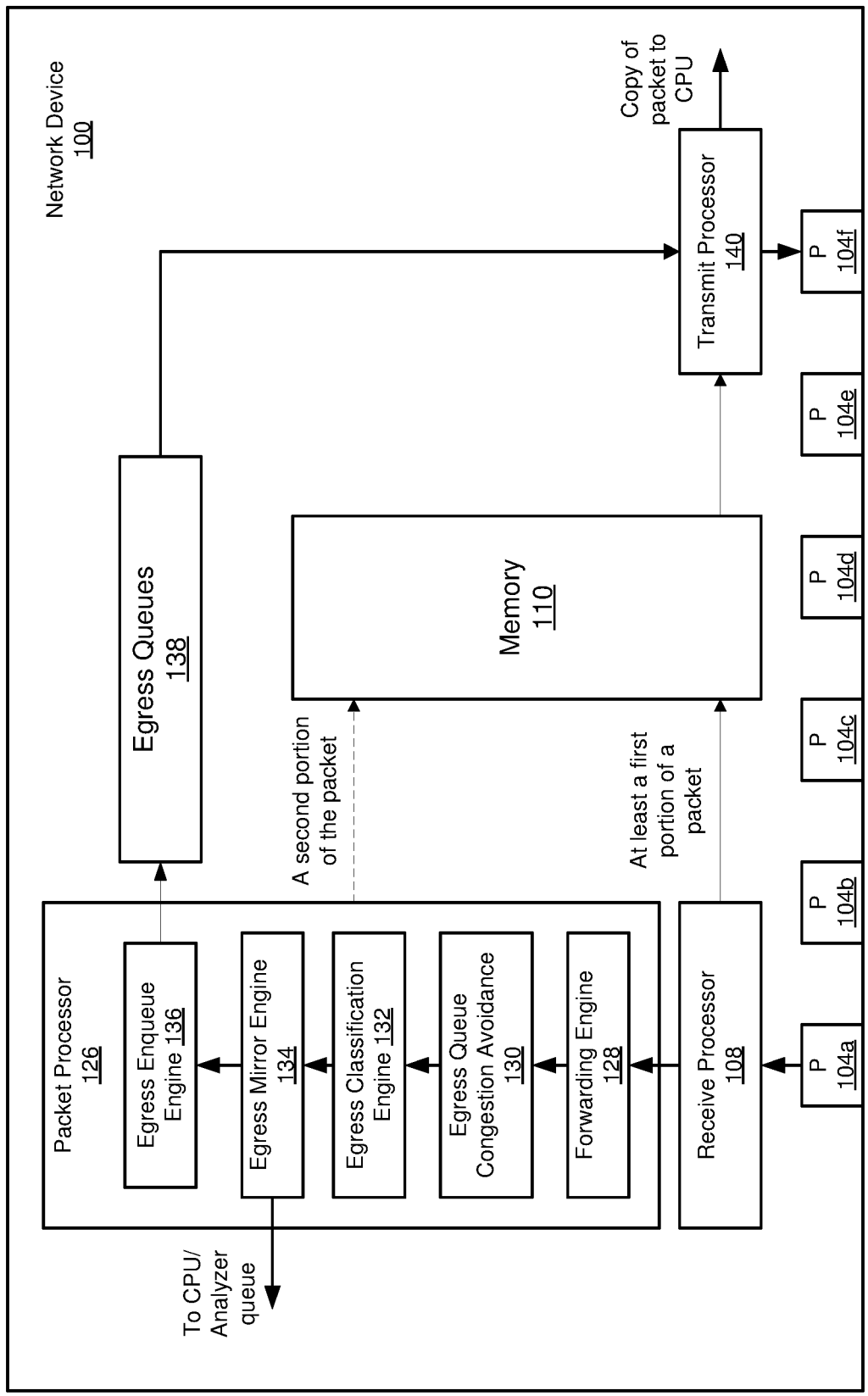
FIG. 1 is a block diagram of an example network device, according to an embodiment.

In various embodiments described herein, a packet is received by a network device, and a copy of the packet is generated for mirroring of the packet to a processor or an analyzer for performing network diagnostics or analytics, for example. In an embodiment, the copy of the packet is generated after egress processing (e.g., egress classification) of the packet is performed and prior to the packet being enqueued in an egress queue for transmission of the packet from the network device. Additionally, egress queue congestion avoidance analysis is performed to determine whether or not a packet should be dropped by the network device, in an embodiment. The egress queue congestion analysis is performed before the packet is provided for egress processing and mirroring by the network device, in some embodiments. Performing egress processing of packets before mirroring the packets allows the network device to make mirroring decisions based on results of egress processing, in at least some embodiments. Moreover, if a decision to not transmit a packet (e.g., to discard the packet) is made during egress processing of the packet, packet mirroring is not be triggered ensuring that a packet is mirrored by the network device only if the packet is actually transmitted from the network device. Further, performing egress queue congestion avoidance analysis prior to providing packets for egress processing and mirroring allows the network device to trigger egress classification and mirroring of packets only if the packets will actually be transmitted by the network device, in at least some embodiments.

In an embodiment, when a packet is received by the network device, at least a first portion (e.g., at least a payload) of the packet is stored in a packet memory of the network device, and a second portion (e.g., at least a portion of a header) of the packet is provided to a packet processor for processing of the packet by the network device. Processing of the packet includes determining at least one egress port via which the packet is to be transmitted from the network device, in an embodiment. Processing of the packet additionally includes modifying the header of the packet to generate a modified header to be included in an egressing packet, in at least some scenarios, in an embodiment. After the header of the packet is modified, egress packet processing operations, such as, for example, egress flow classification, egress policing, egress Operations, Administration, and Maintenance (OAM) processing, etc., are performed based at least in part on the modified header of the packet, in an embodiment. Additionally, an egress mirroring decision is made to determine whether or not the egressing packet should be mirrored, in an embodiment. The egress mirroring decision is made based at least in part on the egress processing based on the modified header of the packet, in an embodiment. Further, if a packet is discarded based on egress processing of the packet, egress mirroring is not triggered for the packet, in an embodiment. The second portion of the packet is then stored in the packet memory, wherein the second portion includes the modified header, in an embodiment. A packet descriptor associated with the packet is enqueued in one or more egress queues for subsequent transmission of the packet via the determined at least one port, in an embodiment. Additionally, when the egress packet is to be mirrored, a copy of the packet descriptor is generated, and the copy of the packet descriptor is enqueued in a queue so that the packet can subsequently be provided to a CPU and/or transmitted to an analyzer, for example. Subsequently, the packet (e.g., the first portion of the packet and the second potion of the packet) is retrieved from the packet memory a first time for transmission of the packet via the determined at least one port of the network device, in an embodiment. The packet (e.g., the first portion of the packet and the second potion of the packet) is additionally retrieved from the packet memory a second time so that the packet can be provided to the CPU and/or transmitted to the network analyzer, in an embodiment.

FIG. 1 is a block diagram of an example network device 100 configured to implement egress packet mirroring techniques described herein, according to an embodiment. The network device 100 includes a plurality of ports 104 communicatively coupled to a plurality of network links (not shown). Although six ports 104 are illustrated in FIG. 1, the network device 100 includes any suitable number of ports 104 in various embodiments. In an embodiment, a packet received by the network device via a port 104 is provided to a receive processor 108 coupled to the port 104. Although only one receive processor 108 is shown in FIG. 1, and the one receive processor 108 is shown as being coupled to only one port 104, the network device 100 includes multiple receive processors 108 and each of the multiple respective processors 108 is coupled to respective one or multiple ports 104, in various embodiments.

The receive processor 108 is configured to store received packets in a packet memory 110. In an embodiment, the receive processor 108 is configured store the packet or a first portion of a received packet in a packet memory 110. In an embodiment, the first portion of the packet includes a tail portion of the packet. For example, the first portion of the packet includes at least a payload of the packet. The first portion of the packet excludes a second portion of the packet, in an embodiment. For example, the first portion of the packet excludes at least a portion of a header of the packet, in an embodiment. Accordingly, the at least the portion of the header of the packet is initially not stored in the packet memory 110, in this embodiment. The receive processor 108 stores the packet or the first portion of the packet at a first memory location in the packet memory 110, in an embodiment. In some embodiments, the receive processor 108 determines the first memory location in the packet memory 110 at which to store the packet or the first portion of the packet. In some embodiments, the receive processor 108 receives, from the packet memory 110 in response to a write request from the receive processor 108, an indicator (e.g., an address, a pointer, etc.) of the first memory location in the packet memory 110 at which the packet or the first portion of the packet is stored.

The packet is provided to a packet processor 126 for processing of the packet. In an embodiment, a packet descriptor associated with the packet is generated, and the packet descriptor rather than the packet itself is provided to the packet processor 126 for processing of the packet. In an embodiment, the receive processor 108 is configured to generate the packet descriptor associated with the packet. In other embodiments, another suitable device or module within the network device 100 is configured to generate the packet descriptor associated with the packet. In an embodiment, the packet descriptor contains information from the header of the packet that the packet processor 126 utilizes to process the packet. In some embodiments, the packet descriptor includes the indicator of the first memory location at which the packet or the first portion of the packet is stored in the packet memory 110. In some embodiments, the packet descriptor additionally includes one or more of (i) the second portion of the packet which was not initially stored in the packet memory 110, (ii) at least the portion of the header of the packet and (iii) other information that the packet processor 126 utilizes for processing of the packet. For ease of explanation, the term "packet" as used herein is used to refer to a packet itself or to a packet descriptor associated with the packet.

The packet processor 126 is configured to process the packet based on one or more of (i) the information from the header of the packet included in the packet descriptor, (ii) the second portion of the packet and (iii) the at least the portion of the header of the packet provided to the packet processor 126, in an embodiment. In an embodiment, the packet processor 126 updates the packet descriptor to indicate certain processing results or decisions made for the packet during processing of the packet. In an embodiment, processing of the packet includes determining at least one port 104 to which the packet is to be forwarded. For example, the packet processor 126 includes a forwarding engine 128 configured to determine, based on header information, one or more egress ports 104 to which the packet is to be forwarded. The forwarding engine 128 includes or is coupled to a forwarding database (not shown) that stores forwarding information (e.g., port information) associated with addresses (e.g., media access control (MAC) addresses, Internet Protocol (IP) addresses, etc.) and/or other suitable information, in an embodiment. In an embodiment, the forwarding engine 128 is configured to utilize header information to look up information in the forwarding database that indicates one or more ports 104 to which the packet is to be forwarded.

Processing of the packet additionally includes modifying a header of the packet based on a processing result for the packet, in at least some situations, in an embodiment. In some embodiments, the packet processor 126 determines whether to and/or how to modify the header of the packet, and a header alteration engine (not shown) performs header alteration, if needed, as determined by the packet processor 126. In some scenarios, the header alteration engine performs one or more modifications in the header of the packet e.g., to change a next hop address, to add an encapsulating header, to remove an encapsulating header, etc. In some embodiments, after header modification is performed, the second portion of the packet is stored in the packet memory 110, wherein the second portion of the packet includes the modified packet header. In an embodiment, the second portion of the packet is stored at a second memory location in the packet memory 110. In an embodiment, the second memory location is separate from and independent of the first memory location at which the first portion of the packet is stored in the packet memory 110. In an embodiment, the packet descriptor associated with the packet is updated to include an indicator (e.g., an address, a pointer, etc.) of the second memory location at which the second portion of the packet is stored in the packet memory 110. In some embodiments, the packet processor 126 determines the second memory location in the packet memory 110 at which to store the second portion of the packet. In some embodiments, the packet processor 126 receives, from the packet memory 110 in response to a write request from the packet processor 126, an indicator (e.g., an address, a pointer, etc.) of the second memory location in the packet memory 110 at which the second portion of the packet is stored.

After the at least one port 104 to which the packet is to be forwarded has been determined, the packet is enqueued in an egress queue 138, of a plurality of egress queues 138, corresponding to the determined at least one port 104 to await subsequent transmission of the packet via the determined at least one port 104. To prevent overflow in the egress queue 138 due, for example, to congestion on network links coupled to corresponding ports 104, a congestion avoidance engine 130 implements a suitable congestion avoidance technique, in an embodiment. In an embodiment, the congestion avoidance engine 130 receives feedback from the egress queues 138 and controls flow of packets to the egress queues 136 based on the feedback received from the egress queues 138. In various embodiments, feedback that the congestion avoidance engine 130 receives from the egress queues 138 includes current fill levels of the egress queues 138, indicators of egress queues 138 that are nearing overflow, or other suitable information that allows the congestion avoidance engine 130 to suitably control flow of packets to the egress queues 138 to avoid overflow in the egress queues 138. In an embodiment, the congestion avoidance engine 130 implements a tail-drop technique, or another suitable technique, to mitigate congestion in the egress queues 138. In some embodiments, the technique implemented by the congestion avoidance engine 130 to mitigate congestion in the egress queues 138 as Weighted Tail Drop (WTD), a random early detection (RED) technique, a weighted random early detection (WRED) technique, or another suitable technique. In an embodiment, the congestion avoidance engine 130 determines that a packet should be dropped if the egress queue 138 in which the packet is to be enqueued is full or if the fill level of the queue exceeds a predetermined threshold. In other embodiments, the congestion avoidance engine 130 determines that a packet should be dropped according to other suitable criteria that ensure that overflow of the egress queue 138 in which the packet is to be enqueued is avoided.

Packets for which a determination to not be dropped is made by the congestion avoidance engine 130 are provided to an egress classification engine 132. The egress classification engine 132 is configured to perform egress classification of a packet, for example to determine an egress flow to which the packet belongs, apply egress access control list (ACL) rules to the packet, etc., in an embodiment. The egress classification engine 132 determines, based on egress classification of the packet, whether (i) the packet should actually be transmitted from the network device 100 or (ii) the packet should not be transmitted but instead should be discarded or trapped, for example, etc., in an embodiment. In an embodiment, the egress classification engine 132 performs egress classification of the packet based at least in part on information determined for the packet during processing of the packet by the packet processor 126. For example, in an embodiment, the egress classification engine 132 performs egress classification based on a modified header of a packet and/or based on processing results included in the packet descriptor associated with the packet. In an embodiment, the egress classification engine 132 utilizes one or more ternary content-addressable memory devices (TCAMs) or other suitable memories, and the one or more TCAMs or the other suitable memories store associations between various header information and/or packet descriptor information and egress flows of packets or actions to be applied to the packets. In an embodiment, the egress classification engine 132 accesses a TCAM or the other suitable memory using header information and/or packet descriptor information to identify egress flow of a packet and/or determine one or more actions to be performed with respect to the packet. In some situations, an action to be performed with respect to the packet is to trap or discard the packet, for example due to an egress ACL policy applied to the packet, in an embodiment.

In an embodiment, when the egress classification engine 132 determines that the packet should actually be transmitted from the network device 100 and should not be, for example, trapped or discarded by the network device 100, the egress classification engine 132 provides the packet to an egress mirroring engine 134. The egress mirror engine 134 implements mirroring of some or all packets provided to the egress mirror engine 134 to a destination other than the determined at least one port 104 for transmission of a packet. For example, the egress mirror engine 134 implements mirroring of a packet to provide a copy of the packet to a CPU of the network device 100 and/or to an analyzer coupled directly or indirectly to a port 104 of the network device 100 (other than the determined at least one port 104 for transmission of the packet), in an embodiment. In an embodiment, the egress mirror engine 134 determines whether or not to mirror a packet based on information in a packet header and/or information in a packet descriptor associated with the packet. In an embodiment, the egress mirror engine 134 determines whether or not to mirror a packet based on one or more classification results determined by the egress classification engine 132 for the packet. For example, in an embodiment, the egress mirror engine 134 determines whether or not to mirror a packet based on the egress flow determined for the packet by the egress classification engine 132. The egress mirror engine is configured to mirror packets that belong to one or more egress flows and to not mirror packets that belong to one or more egress flows, for example, in an embodiment. In some embodiments, the egress classification engine 132 is configured to determine whether or more a packet is to be mirrored. For example, the determination of whether or not a packet is to be mirrored is part of egress classification of the packet, in an embodiment. As an example, the egress classification engine 132 accesses the TCAM or the other suitable memory using header information and/or packet descriptor information to determine whether a packet is to be mirrored, in an embodiment. In an embodiment, the egress classification engine 132 includes, in a packet descriptor associated with the packet, an indication of whether or not the packet is to be mirrored. In this embodiment, the egress mirror engine 134 determines whether or not to mirror the packet based on the indication included in the packet descriptor associated with the packet.

In an embodiment, in order to mirror a packet, the egress mirror engine 134 generates a copy of the packet descriptor associated with the packet. In another embodiment, an egress packet descriptor is first generated for the packet, and the egress mirror engine 134 generates a copy of the egress descriptor. The egress packet descriptor is generated after the second portion of the packet is stored in the packet memory 110, in an embodiment. The egress packet descriptor is smaller (e.g., includes fewer number of bits) than the packet descriptor utilized to process the packet by the packet processor 126, in an embodiment. For example, the egress packet descriptor includes only information needed to retrieve the packet from the packet memory 110, such as indication or indications of memory location(s) at which the packet or portions of the packet are stored in the packet memory 110. The egress packet descriptor omits header information and at least some processing results that were included in the packet descriptor that was utilized to process the packet, in an embodiment. The copy of the packet descriptor or the copy of the egress packet descriptor is provided to a queue so that the packet can subsequently be provided to a CPU of the network device 100 and/or to an analyzer coupled directly or indirectly to a port 104 of the network device 100, in an embodiment.

Modifying the header of the packet prior to storing the header in the packet memory 110 allows the packet processor 126 to perform egress classification of the packet based on the modified header of the packet before the packet is enqueued in an egress queue 138 and before the packet is retrieved from the packet memory 110 when the packet is scheduled for transmission from the network device 100, in an embodiment. Thus, egress mirroring of the packet by the egress mirror engine 134 is performed based on results of egress processing of the packet, and a copy of the packet is subsequently retrieved from the packet memory 110 so that the packet can be provided a CPU of the network device 100 and/or to an analyzer coupled directly or indirectly to a port 104 of the network device 100, in an embodiment. Moreover, if a determination to trap or discard the packet is made based on (or as part of) egress classification of the packet, egress mirroring will not be triggered for the packet, in an embodiment. As a result, egress mirroring is performed only for packets that are actually transmitted from the network device 100, in at least some embodiments.

A packet processed by the egress mirroring engine 134 is provided to an egress enqueue engine 136, in an embodiment. The egress enqueue engine 136 places the packet (e.g., places the packet descriptor associated with the packet or the egress packet descriptor generated for the packet) in the egress queue 138 in which the packet is to be enqueued, in an embodiment. Subsequently, when the packet is scheduled to be forwarded to a port 104 for transmission via the port 104, the packet descriptor or the egress packet descriptor is dequeued from the egress queue 138 and is provided to a transmit processor 140 for subsequent transmission of the packet via the port 104. Although only one transmit processor 140 is shown in FIG. 1, and the one transmit processor 140 is shown as being coupled to only one port 104, the network device 100 includes multiple transmit processors 140 and each of the multiple transmit processors 140 is coupled to respective one or more ports 104, in various embodiments. The transmit processor 140 retrieves the packet from the packet memory 110 using memory location information included in the packet descriptor or the egress packet descriptor, in an embodiment. The transmit processor 140 then forwards the packet to the port 104 for transmission of the packet via the port 104, in an embodiment. Similarly, when the copy of the packet descriptor or the copy of the egress packet descriptor is dequeued from the egress queue 138 in which the packet descriptor or the copy of the egress packet descriptor was enqueued, the packet is retrieved from the packet memory 110 and is provided to the CPU and/or is transmitted via the port 104 coupled to the analyzer, in an embodiment.

Figure 2:
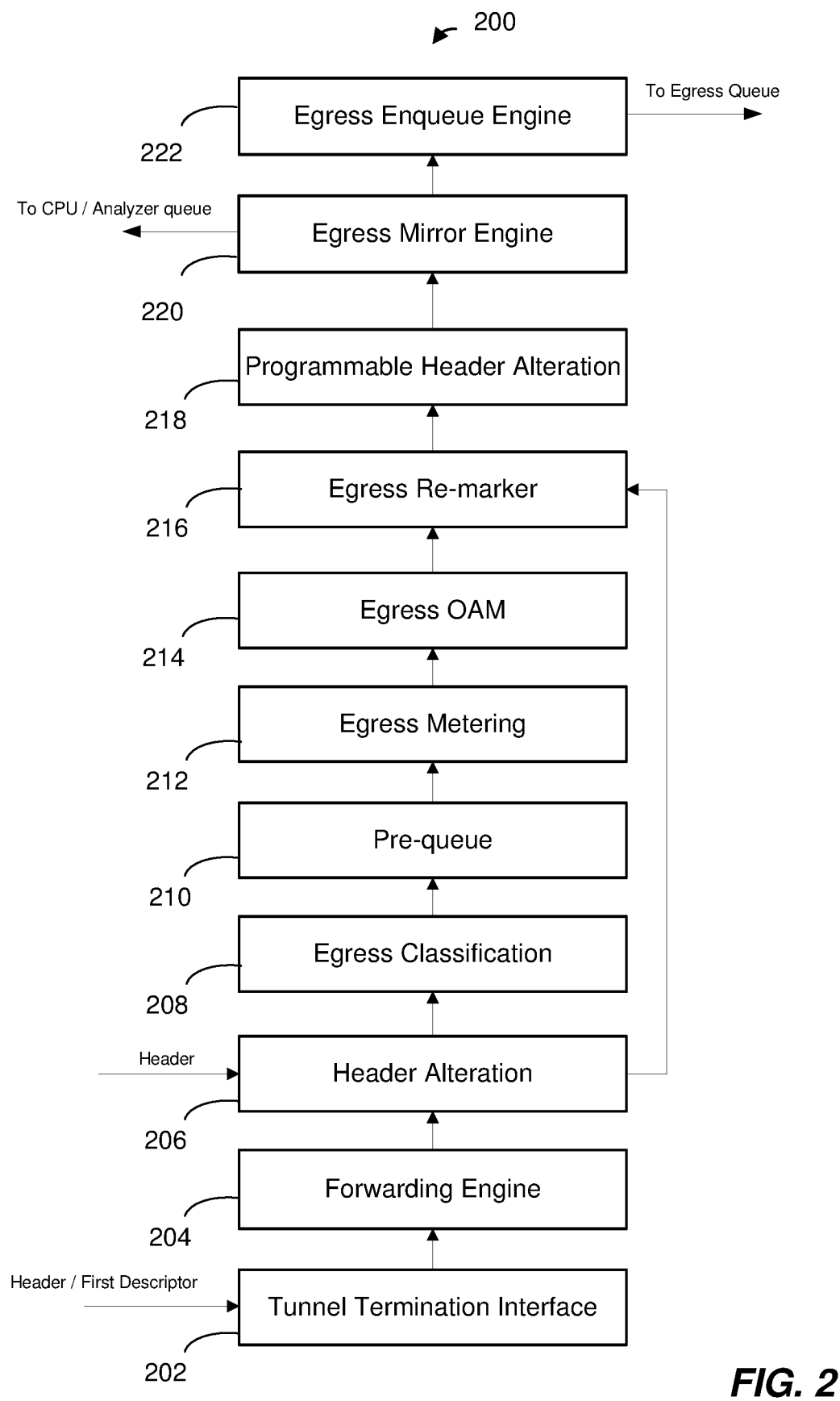
FIG. 2 is a block diagram of an example processing pipeline included in the network device of FIG. 1, according to an embodiment.

FIG. 2 is a block diagram of a processing pipeline 200 included in a packet processor, such as the packet processor 126 of the network device 100 of FIG. 1, according to an embodiment. For ease of explanation, the processing pipeline 200 is described with reference to the network device 100 of FIG. 1. However, the processing pipeline 200 is used with network devices different from the network device 100 of FIG. 1, in some embodiments. Similarly, the network device 100 utilizes a processing pipeline different from the pipeline 200, or utilizes a processing architecture different from a processing pipeline (e.g., parallel processing architecture), in some embodiments.

In an embodiment, a packet is received by the network device 100 and is provided for processing to the processing pipeline 200. In an embodiment, at least a portion of the packet (e.g., at least a payload of the packet) is stored in the packet memory 110, and a packet descriptor and/or a second portion (e.g., a header) of the packet is provided to the processing pipeline 200 for processing of the packet. The processing pipeline 200 processes the packet based on header information, in an embodiment. For example, the processing pipeline 200 processes the packet based on header information included in the packet descriptor associated with the packet, in an embodiment.

The processing pipeline 200 includes a tunnel termination interface (TTI) classification engine 202. The TTI classification engine 202 generally performs a lookup function (a tunnel termination interface (TTI) lookup) used for tunnel termination identification and/or classifying a logical interface according to L2 or L3 header fields. The TTI lookup indicates that the packet should be associated with one or more TTI actions, such as assigning a virtual LAN (VLAN) identifier, quality of service (QoS) parameters, etc., to the data frame. In an embodiment, if the TTI lookup utilizes a source port indicator, the local source port indicator is utilized.

A forwarding engine 204 is coupled to the TTI classification engine 202. The forwarding engine 204 determines at least one port 104 to which the packet is to be forwarded, in embodiment. The forwarding engine 204 corresponds to the forwarding engine 128 of FIG. 1, in an embodiment. The forwarding engine 204 includes, or is coupled to, a forwarding database (not shown) that stores forwarding information (e.g., port information) associated with addresses (e.g., MAC addresses, IP addresses, etc.) and/or other suitable information, in an embodiment. In an embodiment, the forwarding engine 204 is configured to utilize information from the header of the packet to look up information in the forwarding database that indicates the at least one port 104 to which the packet is to be forwarded. The forwarding engine 204 updates the packet descriptor associated with the packet to include an indicator or indicators of the port or ports to which the packet is to be forwarded, in an embodiment.

A header alteration engine 206 is coupled to the forwarding engine 204. The header alteration engine 206 modifies the second portion (e.g., the header) of the packet, if such modification is needed, in an embodiment. For example, the header alteration engine 206 modifies the header of the packet based on a processing result for the packet, in at least some situations, in an embodiment. In some embodiments, the processing pipeline 200 determines whether to and/or how to modify the header of the packet, and the header alteration engine 206 performs header alteration, if needed, as determined by the processing pipeline 200. In various embodiments and scenarios, the header alteration engine 206 modifies the header of the packet e.g., to change a next hop address, to add an encapsulating header, to remove an encapsulating header, etc.

An egress classification engine 208 is coupled to the header alteration engine 206. The egress classification engine 208 corresponds to the egress classification engine 132 of FIG. 1, in an embodiment. The egress classification engine 208 further processes the packet based on a (modified or unmodified) header of the packet. For example, the egress classification engine 208 determines an egress flow to which the packet belongs, in an embodiment. The egress classification engine 208 updates the packet descriptor associated with the packet to include an indicator of the egress flow of the packet, in an embodiment. As another example, egress classification engine 208 applies one or more ACL rules to the packet based on information included in the (modified or unmodified) header of the packet, in an embodiment.

A pre-queue engine 210 is coupled to the egress classification engine 208. The pre-queue processor 210 corresponds to the congestion avoidance engine 130 of FIG. 1, in an embodiment. The pre-queue processor 210 implements congestion avoidance, for example to control flow of packets to the transmit queues 138 so as to avoid overflow of the transmit queues 138, in an embodiment.

An egress metering engine 212 accounts for the packet, for example by incrementing one or more counters associated with a port 104 that is to transmit the packet as determined by the forwarding engine 202, in an embodiment. An egress OAM engine 214 is coupled to the egress metering engine 212. In an embodiment, the egress OAM engine 214 processes OAM packets, for example to monitor or control the health of a network. An egress re-marker engine 216 applies remarks to a QoS field in the second portion (e.g., the header) of the packet, in an embodiment. A programmable header alteration engine 218 performs additional modification of the second portion (e.g., the header) of the packet. The programmable header alteration engine 218 allows for flexibility in header alteration, when needed, in an embodiment. An egress mirror engine 220 is coupled to the egress re-marker engine 218. The egress mirror engine 220 corresponds to the egress mirror engine 134 of FIG. 1, in an embodiment. The egress mirroring engine 220 generates a copy of the packet for mirroring of the packet to CPU and/or an analyzer (e.g., a network analyzer) coupled directly or indirectly to a port of the network device. In an embodiment, the egress mirror engine 220 generates a copy of the packet descriptor associated with the packet. In another embodiment in which an egress packet descriptor associated with the packet, the egress packet descriptor being shorter than the packet descriptor utilized to process the packet, is generated, the egress mirror engine 220 generates a copy of the egress packet descriptor associated with the packet. In an embodiment, the egress mirror engine 220 provides the generated copy of the packet, the generated copy of the packet descriptor, or the generated copy of the egress packet descriptor, to a CPU and/or to a queue corresponding to the port coupled directly or indirectly to an analyzer for subsequent transmission of the packet to the analyzer.

An egress enqueue engine 222 enqueues the packet in an egress queue corresponding to the at least one port to which the packet is to be forwarded, in an embodiment. The egress enqueue engine 222 corresponds to the egress enqueue engine 136, in an embodiment. In an embodiment, the egress enqueue engine 222 provides the packet, the packet descriptor associated with the packet, or the egress packet descriptor generated for the packet, to the egress queue corresponding to the at least one port to which the packet is to be forwarded.

Figure 3:
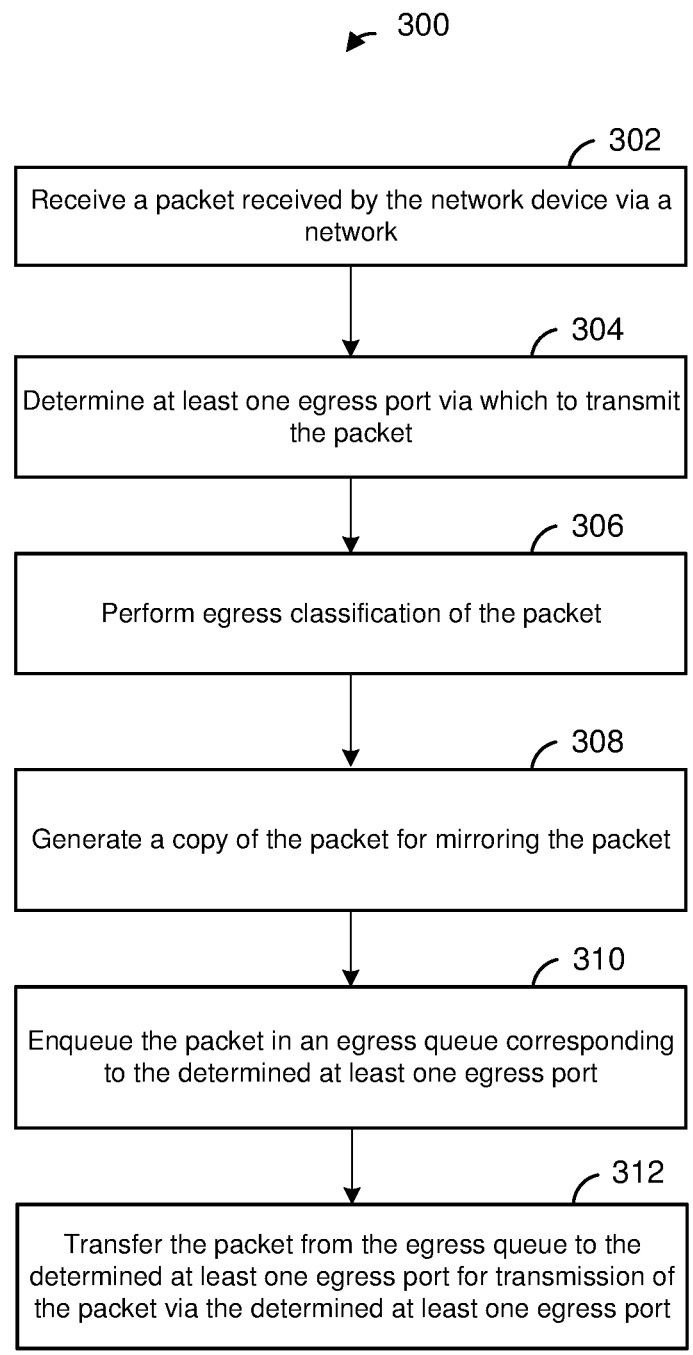
FIG. 3 is a flow diagram of an example method for mirroring of egress packets a network device, according to an embodiment.

FIG. 3 is a flow diagram illustrating an example method 300 for processing packets in a network device, according to an embodiment. In an embodiment, the network device 100 implements the method 300 to process a packet received by the network device 100. In an embodiment, the packet processor 126 of the network device 100 implements at least a portion of the method 300 to process a packet received by the network device 100. The method 300 is described with reference to the network device 100 merely for explanatory purposes. In other embodiments, the method 300 is implemented by another suitable network device.

At a block 302, a packet received via a port of a network device is received by a receive processor of the network device. In an embodiment, the packet is received by the receive processor 108 of FIG. 1. In another embodiment, the packet is received by a suitable processor different from the receive processor 108 of FIG. 1. In an embodiment, when the packet is received, at least a portion of the packet is stored in a packet memory. In an embodiment, the at least the portion of the packet is stored in the packet memory 110 or FIG. 1. In another embodiment, the at least the portion of the packet is stored in a suitable packet memory different from the packet memory 110 of FIG. 1. Additionally a packet descriptor associated with the packet is generated at block 302, in some embodiments.

At blocks 304 and 306, the packet is processed using header information and/or information included in the packet descriptor associated with the packet. More specifically, at block 304, at least one egress port via which the packet is to be transmitted is determined. The at least one egress port is determined based on one or more addresses included in the header of the packet and/or the packet descriptor associated with the packet, in an embodiment. At block 306, egress processing of the packet is performed. In an embodiment, egress processing of the packet at block 306 includes modifying a header of the packet, based on information determined for the packet during processing of the packet by the network device. Egress processing of the packet also includes performing egress classification of the packet based at least in part on the modified header of the packet, in an embodiment. Egress classification of the packet includes, for example, identifying an egress flow to which the packet belongs, applying an access control policy is to the packet, applying egress OAM packet policing to the packet, etc., in various embodiments. In an embodiment, the egress classification is performed at block 306 based at least in part on the at least one egress port determined for the packet at block 304. In an embodiment, egress classification of the packet at block 306 includes determining whether the packet should not be transmitted by the network device, but instead should be, for example, trapped or discarded by the network device.

Block 306 is followed by blocks 308-312, in an embodiment. In an embodiment, blocks 308-312 are performed only when a determination that the packet should not be transmitted is not made at block 306. For example, blocks 308-312 are performed when it is determined that the packet should be discarded by the network device, in an embodiment. At block 308, a copy of the packet is generated for mirroring of the packet. In an embodiment, a copy of the packet descriptor associated with the packet, rather than a copy of the packet itself, is generated at block 308. In an embodiment, a transmit packet descriptor is generated for the packet, where the egress packet descriptor is shorter than the packet descriptor utilized to process the packet. In this embodiment, a copy of the egress packet descriptor, rather than a copy of the packet itself, is generated at block 308.

At block 310, the packet is enqueued in an egress queue corresponding to the at least one port determined for the packet at block 304. Enqueueing the packet in the egress queue at block 310 is performed after generating the copy of the packet at block 308, in an embodiment. In an embodiment, the packet descriptor associated with the packet, rather than the packet itself is enqueued in the egress queue. In another embodiment in which an egress packet descriptor, shorter than the packet descriptor utilized to process the packet, the egress packet descriptor is enqueued in the egress queue at block 310.

At block 312, the packet is transferred to the at least one port determined for the packet at block 304. In an embodiment, prior to being transferred to the at least one port, the at least the portion of the packet is retrieved from the packet memory, and the at least the portion of the packet is transferred to the at least one port.

A method for processing packets in a network device includes receiving, at a packet processor of the network device, a packet from a network link. The method also includes processing, with the packet processor, the packet at least to (i) determine at least one egress port via which the packet is to be transmitted and (ii) perform egress processing of the packet, egress processing including at least (a) modifying, based at least in part on information determined for the packet during processing of the packet by the packet processor, a header of the packet to generate a modified header and (b) performing egress classification of the packet based at least in part on the modified header egress classification including determining whether the packet is to be discarded by the network device. The method additionally includes when it is determined that the packet is to be discarded by the network device: generating, with the packet processor, a copy of the packet for mirroring of the packet to a destination other than the determined at least one egress port; and enqueueing the packet in an egress queue corresponding to the determined at least one egress port, and transferring the packet from the egress queue to the determined at least one egress port for transmission of the packet, to another network device disposed in a network, via the determined at least one egress port.

In other embodiments, the method includes any suitable combination of one or more of the following features.

The method further includes determining, with the packet processor based on a result of the egress classification of the packet, the egress classification performed based at least in part on the modified header, whether the packet is to be mirrored.

Generating, with the packet processor, the copy of the packet comprises generating the copy only if it is determined that the packet is to be mirrored.

The method further includes determining, with the packet processor, whether the packet is to be dropped due to congestion in the egress queue.

Generating the copy of the packet comprises generating the copy only when it is determined that the packet is not to be dropped due to congestion in the egress queue.

Determining whether the packet is to be dropped comprises determining that the packet is to be dropped if a fill level of the egress queue exceeds a predetermined threshold.

The method further includes providing the copy of the packet to one or both of (i) a central processing unit (CPU) of the network device and (ii) a port of the network device, the port being coupled directly or indirectly to an analyzer, for transmission of the copy of the packet to the analyzer.

The method further includes, prior to processing the packet, storing, with the receive processor, at least a portion of the packet in a packet memory, and wherein:

Processing the packet comprises processing the packet using a packet descriptor associated with the packet.

Generating the copy of the packet comprises generating a copy of the packet descriptor associated with the packet prior to retrieving the at least the portion of the packet from the packet memory.

The method further includes enqueueing the copy of the packet descriptor in an additional egress queue, the additional egress queue corresponding to a port, of the network device, directly or indirectly coupled to an analyzer.

The method further includes, when the packet is dequeued from the egress queue, retrieving, with the transmit processor, at least the portion of the packet from the packet memory for transmission of the packet via the determined at least one egress port.

The method further includes, when the copy of the packet descriptor is dequeued from the additional egress queue, retrieving the at least the portion of the packet from the packet memory for transmission of the packet to the analyzer.

Retrieving the at least the portion of the packet from the packet memory for transmission of the packet to the analyzer comprises retrieving the at least the portion of the packet from the packet memory after the at least the portion of the packet is retrieved from the packet memory for transmission of the packet via the determined at least one port.

In another embodiment, a network device comprises a receive processor configured to receive a packet from a network. The network device also comprises a packet processor configured to process the packet at least to: determine at least one egress port via which the packet is to be transmitted; modify, based at least in part on information determined for the packet during processing of the packet by the packet processor, a header of the packet to generate a modified header; perform egress classification of the packet based at least in part on the modified header, egress classification including determining whether the packet is to be discarded by the network device; and, when it is determined that the packet is not to be discarded by the network device, generate a copy of the packet for mirroring the packet to a destination other than the determined at least one egress port, and enqueue the packet in an egress queue corresponding to the determined at least one egress port. The network device additionally comprises a transmit processor configured to transfer the packet from the egress queue to the determined at least one egress port for transmission of the packet via the determined at least one egress port.

In other embodiments, the network device further comprises any suitable combination of one or more of the following features.

The packet processor is further configured to determine, based on a result of the egress classification of the packet, the egress classification performed (i) based at least in part on the modified header and (ii) prior to enqueueing the packet in the egress queue, whether the packet is to be mirrored.

The packet processor is configured to generate the copy of the packet only if it is determined that the packet is to be mirrored.

The packet processor is further configured to determine, prior to generating the copy of the packet, whether the packet is to be dropped due to congestion in the egress queue.

The packet processor is configured to generate the copy of the packet only when it is determined that the packet is not to be dropped due to congestion in the egress queue.

The packet processor is configured to determine that the packet is to be dropped if a fill level of the egress queue exceeds a predetermined threshold.

The packet processor is further configured to perform one or both of (i) provide the copy of the packet to a central processing unit (CPU) of the network device and (ii) enqueue the packet in an additional egress queue, the additional egress queue corresponding to a port, of the network device, coupled directly or indirectly to an analyzer, for subsequent transmission of the copy of the packet to the analyzer.

The receive processor is configured to store at least a portion of the packet in a packet memory/

The packet processor is configured to process the packet using a packet descriptor associated with the packet, and generate the copy of the packet at least by generating a copy of the packet descriptor associated with the packet prior to the at least the portion of the packet being retrieved from the packet memory.

The packet processor is further configured to enqueue the copy of the packet descriptor in an additional egress queue corresponding to a port, of the network device, directly or indirectly coupled to an analyzer.

The transmit processor is configured to, when the packet is dequeued from the egress queue, retrieve the at least the portion of the packet from the packet memory for transmission of the packet via the determined at least one egress port.

The transmit processor is further configured to, when the copy of the packet descriptor is dequeued from the additional egress queue, retrieve the at least the portion of the packet from the packet memory for transmission of the packet to the analyzer.

The transmit processor is configured to retrieve the packet from the packet memory for transmission of the packet to the analyzer after the packet is retrieved from the packet memory for transmission of the packet via the at determined least one egress port.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A network device for processing packets in a communication network, comprising:
   a receive processor configured to:
      receive a packet from the communication network, and
      store at least a payload of the packet in a packet memory;

a packet processor configured to process the packet, the packet processor being configured to at least:
  determine at least one egress port via which the packet is to be transmitted by the network device,
  modify one or more fields in a header of the packet to generate a modified header,
  determine, based at least in part on the modified header, whether the packet a) is to be transmitted by the network device or b) is to be discarded by the network device, and
  store the modified header in the packet memory; and
a transmit processor configured to, in response to the determination, made by the packet processor based at least in part on the modified header, that the packet is to be transmitted by the network device and not to be discarded by the network device:
  retrieve the at least the payload of the packet from the packet memory,
  retrieve the modified header from the packet memory,
  generate a transmit packet at least by combining the at least the payload of the packet with the modified header, and
  transmit the transmit packet via the determined at least one egress port of the network device.

2. The network device of claim 1, wherein the packet processor is configured to:
  store the at least the payload of the packet at a first memory location in the packet memory, and
  store the modified header at a second memory location, separate from the first memory location, in the packet memory.

3. The network device of claim 2, wherein the packet processor is configured to
  process the packet using a packet descriptor associated with the packet, and
  after processing the packet using the packet descriptor,
    generate an egress packet descriptor corresponding to the packet, the egress packet descriptor being smaller than the packet descriptor used for processing of the packet, and
    in response to determining that the packet is to be transmitted from the network device, enqueue the egress packet descriptor in an egress queue for subsequent transmission of the transmit packet via the determined at least one egress port.

4. The network device of claim 3, wherein the packet processor is configured to generate the egress packet descriptor to include at least memory location information, the memory location information indicating i) the first memory location at which the at least the payload of the packet is stored in the packet memory and ii) the second memory location at which the modified header is stored in the packet memory.

5. The network device of claim 4, wherein the transmit processor is configured to:
  when the egress packet descriptor is dequeued from the egress queue,
    retrieve, based on the memory location information in the egress packet descriptor, the at least the payload of the packet from the first memory location in the packet memory and the modified header from the second memory location in the packet memory, and
    generate the transmit packet at least by combining the at least the payload of the packet retrieved from the first memory location in the packet memory with the modified header retrieved from the second memory location in the packet memory.

6. The network device of claim 4, wherein the packet processor is configured to:
  i) in response to determining that the packet is to be transmitted from the network device and ii) prior to retrieving the at least the payload of the packet from the packet memory,
    generate a copy of the egress packet descriptor, and
    enqueue the copy of the egress packet descriptor in an additional egress queue for mirroring of the packet to a destination other than the determined at least one egress port.

7. The network device of claim 6, wherein the transmit processor is configured to:
  when the copy of the egress packet descriptor is dequeued from the additional egress queue,
    retrieve, based on the memory location information in the copy of the egress packet descriptor, the at least the payload of the packet from the first memory location in the packet memory and the modified header from the second memory location in the packet memory,
    generate a mirrored packet at least by combining the at least the payload of the payload retrieved, based on the memory location information in the copy of the egress packet descriptor, from the first memory location in the packet memory and the modified header retrieved, based on the memory location information in the copy of the egress packet descriptor, from the second memory location in the packet memory, and
    transmit the mirrored packet to the destination other than the determined at least one egress port.

8. The network device of claim 1, wherein the packet processor is configured to, in response to determining that the packet is to be discarded by the network device, i) discard the packet at the network device and ii) not trigger mirroring of the packet by the network device.

9. The network device of claim 1, wherein the packet processor is further configured to perform, based at least in part on the modified header, egress classification of the packet, wherein the packet processor is configured to determine whether the packet a) is to be transmitted by the network device or b) is to be discarded by the network device is performed as part of the egress classification of the packet.

10. The network device of claim 1, wherein the packet processor is configured to determine whether the packet a) is to be transmitted by the network device or b) is to be discarded by the network device based at least in part on application of an access control policy indicated by the one or more modified fields of the header.

11. A method for processing packets in a communication network, the method comprising:
  receiving, at a network device, a packet from the communication network;
  storing, with the network device, at least a payload of the packet in a packet memory of the network device;
  processing, with a packet processor of the network device, the packet, the processing including at least
    determining at least one egress port via which the packet is to be transmitted by the network device,
    modifying one or more fields in a header of the packet to generate a modified header,
    determining, based at least in part on the modified header, whether the packet a) is to be transmitted by the network device or b) is to be discarded by the network device, and
    storing the modified header in the packet memory; and in response to determining that the packet is to be transmitted by the network device and not to be discarded by the network device:
retrieving, with the network device, the at least the payload of the packet from the packet memory,
retrieving, with the network device, the modified header from the packet memory,
generating, with the network device, a transmit packet at least by combining the at least the payload of the packet with the modified header, and
transmitting the transmit packet via the determined at least one egress port of the network device.

12. The method of claim 11, wherein:
storing the at least the payload of the packet in the packet memory comprises storing the at least the payload of the packet at a first memory location in the packet memory, and
storing the modified header in the packet memory comprises storing the modified header at a second memory location, separate from the first memory location, in the packet memory.

13. The method of claim 12, wherein:
processing the packet comprises processing the packet using a packet descriptor associated with the packet, and
the method further comprises, after processing the packet using the packet descriptor,
generating an egress packet descriptor corresponding to the packet, the egress packet descriptor being smaller than the packet descriptor used for processing of the packet, and
in response to determining that the packet is to be transmitted from the network device, enqueuing the egress packet descriptor in an egress queue for subsequent transmission of the transmit packet via the determined at least one egress port.

14. The method of claim 13, wherein generating the egress packet descriptor comprises generating the egress packet descriptor to include at least memory location information, the memory location information indicating i) the first memory location at which the at least the payload of the packet is stored in the packet memory and ii) the second memory location at which the modified header is stored in the packet memory.

15. The method of claim 14, wherein:
the method further comprises, when the egress packet descriptor is dequeued from the egress queue, retrieving, based on the memory location information in the egress packet descriptor, the at least the payload of the packet from the first memory location in the packet memory and the modified header from the second memory location in the packet memory, and
generating the transmit packet includes combining the at least the payload of the packet retrieved from the first memory location in the packet memory with the modified header retrieved from the second memory location in the packet memory.

16. The method of claim 14, further comprising, i) in response to determining that the packet is to be transmitted from the network device and ii) prior to retrieving the at least the payload of the packet from the packet memory, triggering mirroring of the packet, the mirroring including
generating, with the packet processor, a copy of the egress packet descriptor, and
enqueuing the copy of the egress packet descriptor in an additional egress queue for mirroring of the packet to a destination other than the determined at least one egress port.

17. The method of claim 16, further comprising, when the copy of the egress packet descriptor is dequeued from the additional egress queue,
retrieving, based on the memory location information in the copy of the egress packet descriptor, the at least the payload of the packet from the first memory location in the packet memory and the modified header from the second memory location in the packet memory,
generating a mirrored packet at least by combining the at least the payload of the payload retrieved, based on the memory location information in the copy of the egress packet descriptor, from the first memory location in the packet memory and the modified header retrieved, based on the memory location information in the copy of the egress packet descriptor, from the second memory location in the packet memory, and
transmitting the mirrored packet to the destination other than the determined at least one egress port.

18. The method of claim 11, further comprising, in response to determining that the packet is to be discarded by the network device, i) discarding the packet at the network device and ii) not triggering mirroring of the packet by the network device.

19. The method of claim 11, further comprising performing, based at least in part on the modified header, egress classification of the packet, wherein determining whether the packet a) is to be transmitted by the network device or b) is to be discarded by the network device is performed as part of the egress classification of the packet.

20. The method of claim 11, determining whether the packet a) is to be transmitted by the network device or b) is to be discarded by the network device comprises determining whether the packet a) is to be transmitted by the network device or b) is to be discarded by the network device based at least in part on application of an access control policy indicated by the one or more modified fields of the header.

* * * * *